I. B. ROLKA.
LOCK NUT.
APPLICATION FILED OCT. 8, 1913.
1,093,474.
Patented Apr. 14, 1914.
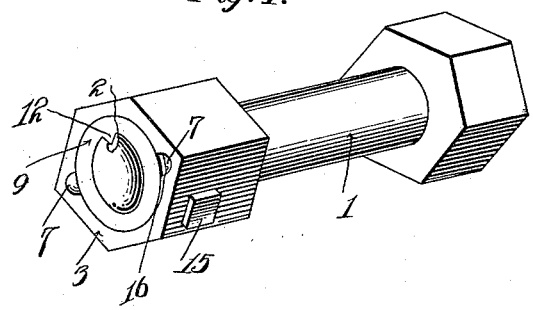
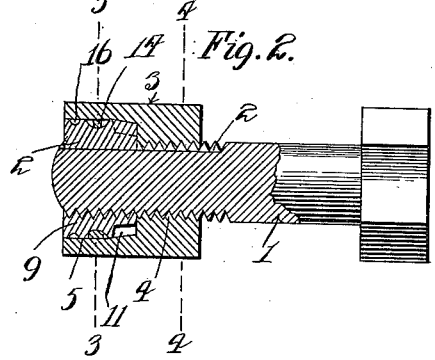
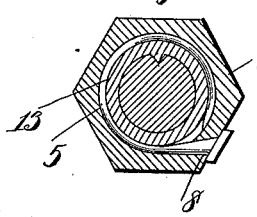
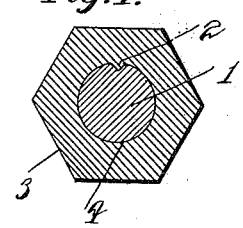
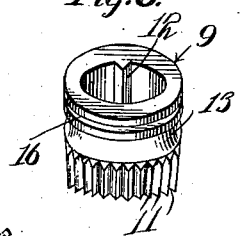
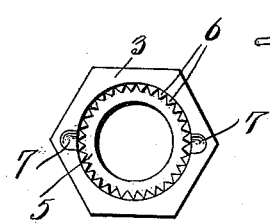
Witnesses
F. H. Taylor
Inventor
I. B. Rolka
By Victor J. Evans
Attorney
COLUMBIA PLANOGRAPH CO., WASHINGTON, D. C.

UNITED STATES PATENT OFFICE.

IGNATIUS B. ROLKA, OF NIAGARA FALLS, NEW YORK.

LOCK-NUT.

1,093,474.  Specification of Letters Patent.  Patented Apr. 14, 1914.

Application filed October 8, 1913. Serial No. 794,113.

*To all whom it may concern:*

Be it known that I, IGNATIUS B. ROLKA, a citizen of the United States, residing at Niagara Falls, in the county of Niagara and State of New York, have invented new and useful Improvements in Lock-Nuts, of which the following is a specification.

The present invention relates to improvements in means for effectively retaining a nut and bolt in locked position, one upon the other, but which also permits of the separation of the nut and bolt when desired.

The invention resides in the construction, combination and arrangement of parts set forth in the following specification and falling within the scope of the appended claim.

In the drawings: Figure 1 is a perspective view of a nut and bolt connected in accordance with my improvement, Fig. 2 is a longitudinal sectional view through the same, Fig. 3 is a horizontal sectional view on the line 3—3 of Fig. 2, Fig. 4 is a similar sectional view on the line 4—4 of Fig. 2, Fig. 5 is a top plan view of the nut, Fig. 6 is a perspective view of the locking sleeve, and Fig. 7 is a perspective view of the malleable locking key.

Referring now to the drawing in detail, the numeral 1 designates a bolt which has its threaded shank provided with a longitudinally extending depression or channel 2, and one of the walls of said channel is arranged angularly of the second wall.

The nut for the bolt is indicated by the numeral 3. This nut has a threaded bore 4, the said bore extending from what I will term the inner face of the said nut and the threads thereof are adapted to engage with the threaded shank of the bolt. The nut 3 is from its outer face formed with an annular and enlarged depression or chamber 5, the lower wall of the same being provided with outwardly projecting teeth 6, and the said teeth terminate with the wall or shoulder provided between the threaded bore 4 and the enlarged chamber 5. The outer face of the nut, at diametrically opposite points, is provided with angularly disposed depressions or notches 7 which enter the chamber 5 but which do not communicate with the outer perimeter of the nut. The nut is further provided upon one of its faces with an opening 8 which enters the channel angularly.

The locking sleeve is indicated by the numeral 9, and has its outer face, adjacent what I will term, its inner end formed with teeth 11 which, when the bolt is screwed upon the nut, are adapted to engage with the teeth 6 of the chamber 5. The bore of the locking sleeve is provided with a substantially V-shaped longitudinally extending rib 12, and this rib is adapted to engage within the depression 2 of the bolt when the locking sleeve is within the chamber 5 upon the bolt and when the nut is locked upon the bolt. The locking sleeve is of a width approximately corresponding with the cross sectional diameter of the chamber 5, and is adapted to snugly fill the chamber when the nut is in its locked position upon the bolt. The locking sleeve, above its teeth 11, is provided with a continuous approximately semi-cylindrical depression 13 which is adapted to register with the opening 8 in the nut when the said sleeve is arranged upon the nut and bolt, and adapted to be passed through the opening 8 and to be guided by the circular wall of the channel to within the depression 13 is a malleable locking key 14. The key is provided with a head 15 which contacts with the outer wall of the nut upon the face thereof provided with the opening 8 and prevents the key from being entirely forced to within the chamber 5 of the nut or to entirely encompass the depression 13, and the said head therefore forms a means which when engaged by a suitable instrument such as a pair of pincers or the like for the withdrawal of the malleable or bendable locking key to permit of the separation of the nut and bolt.

To separate the nut and bolt, it is of course necessary to remove the locking sleeve 9 from the chamber 5, and the said locking sleeve between the depression 13 and the outer face of the said sleeve is formed with an annular channel 16 which is adapted to communicate with the walls of the inclined notches 7, and to permit of the normally rounded and reduced end of the locking key being guided by the said inclined wall of one of the notches to within the said channel to engage with the outer wall thereof and so extract the locking sleeve from the channel and from its engagement with the nut. Of course, another means may be employed for removing the sleeve from the channel, as for instance, the pincers which have been employed for withdrawing the locking key may have its jaws brought into engagement with the opposite faces of the locking sleeve by inserting the jaws of said pincers within the notches 7.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In a device for the purpose set forth, a bolt having its threaded shank formed with a recess, a nut for the bolt, said nut having an enlarged chamber which communicates with its threaded bore, the said chamber being formed with teeth, the outer face of the nut having angular notches which communicate with the chamber, the side of the nut having an angularly disposed opening which communicates with the chamber, a locking sleeve having its bore formed with a rib which is adapted to engage with the depression of the bolt when the sleeve is placed upon the bolt and within the chamber of the nut, the sleeve having its outer face adjacent its inner end provided with teeth which engage with the teeth in the chamber of the nut, the said sleeve having an annular peripheral depression which communicates with the opening in the side of the nut, a malleable headed member adapted to be inserted through the opening to within the depression of the sleeve, the sleeve between the depression and its outer face having a continuous channel, and the inclined walls of the notches of the nut communicating with the said channel.

In testimony whereof I affix my signature in presence of two witnesses.

IGNATIUS B. ROLKA.

Witnesses:
ANDREW BANASZAK,
VINCENT KLUGA.

Copies of this patent may be obtained for five cents each, by addressing the "Commissioner of Patents, Washington, D. C."